June 28, 1966   W. STEDTNITZ   3,258,753
ELECTRICAL COUNTING MECHANISM
Filed Aug. 24, 1962   4 Sheets-Sheet 1

INVENTOR.
WOLFGANG STEDTNITZ
BY
McGlew & Toren
ATTORNEYS.

INVENTOR.
WOLFGANG STEDTNITZ
BY
McGlew & Toren
ATTORNEYS

INVENTOR.
WOLFGANG STEDTNITZ
BY
*McGlew & Toren*
ATTORNEYS.

June 28, 1966  W. STEDTNITZ  3,258,753
ELECTRICAL COUNTING MECHANISM
Filed Aug. 24, 1962  4 Sheets-Sheet 4

INVENTOR.
WOLFGANG STEDTNITZ
BY
*McGlew & Toren*
ATTORNEYS.

3,258,753
ELECTRICAL COUNTING MECHANISM
Wolfgang Stedtnitz, Bad Ragaz, Switzerland, assignor to
Aktiebolaget Bofors, Bofors, Sweden
Filed Aug. 24, 1962, Ser. No. 219,345
Claims priority, application Germany, Aug. 24, 1961,
A 38,178
11 Claims. (Cl. 340—174)

This invention relates to electrical counting mechanism and, more particularly, to a novel and simplified combination of interrelated electrical counters including at least one measurement impulse counter and whereby an exit impulse is delivered from such measurement impulse counter only in the event that a preselected number or preselected combination of entering measuring impulses is present in the measurement counter within a predetermined time period.

When signal impulses entering an electrical counting mechanism are to be processed further in digital counting circuits, storage means operating on the analog principle, and thus integrating the incoming charges, are not suitable. This is particularly true wherein, during a particular time interval of the impulsing period, a signal impulse is expected and has to be distinguished from fortuitous irregular disturbance impulses. In such case, known storage methods and apparatus are extremely complicated and very delicate in operation.

In the tele-communications art, and especially in the radar art, it is frequently necessary to recognize entering signal impulses which differ from disturbance impulses of essentially the same amplitude only in that the signal impulses are characterized by exact periodicity.

With optimum dimensioning of the tele-communication system, improved discrimination between the signal impulses and the disturbance impulses is possible only by lengthening the observation time to cover several impulse periods or, stated another way, by fully utilizing the periodicity of an echo impulse, for example, as in an echo sounding system. By this expedient, the desired signal impulses can be effectively discriminated from the fortuitously occurring disturbance impulses. A practical application of this known expedient occurs, for example, with known line storage devices, such as tubes, in which the line storage is scanned once per each impulse period. Excitation of the storage means is effected by the scanning means, with clearing being effected generally by slow decay of the stored charges. With Braun tubes, or cathode ray tubes, the same effect is utilized for the production of radar pictures. The impulse lines are written so close together that genuine echo impulses or desired impulses brighten the picture screen to a much more intense amount than do fortuitous disturbance impulses.

In accordance with the present invention, it has been found that a simple electrical counting mechanism which is usable for the most diverse counting programs can be provided by utilizing two electrical impulse storing counters and so interconnecting these counters that, responsive to the presence of a first predetermined combination of stored impulses, one of the counters will clear the other before delivery of an exit impulse and, responsive to the presence of a second predetermined combination of stored impulses, the other counter will clear such first counter before delivery of an exit impulse.

With the counting mechanism of the present invention, the aforementioned problem of discriminating between desired pulses, such as echo pulses, and disturbance pulses can be solved in a simple manner and without resorting to observation by the human eye. More particularly, there are, in such an instance, two electrical impulse storage counters, one of which may be termed a measurement counter and the other a time counter. The measurement counter counts or stores measurement impulses, while the time counter is controlled by regularly spaced time impulses having a predetermined time sequence. If a predetermined number of entering time impulses are counted or stored by the time counter before a measurement impulse is received and stored by the measurement counter, the time counter clears the measurement counter. On the other hand, if the measurement counter, since its last clearance, has counted a particular number of measurement impulses or stored a particular impulse sequence before the time counter has counted and stored such predetermined number of time impulses, the measurement counter will deliver an exit impulse.

With time intervals which are indeterminate with respect to their beginning and ending, the counting mechanism of the present invention can be designed to have two electrical impulse and storing counters, one of which is a measurement counter and the other a time counter. The measurement counter stores incoming measurement impulses while the time counter, at the end of a predetermined time interval after the last arriving measurement impulse, clears the measurement counter. On the other hand, the measurement counter is effective to deliver an exit impulse if such predetermined time interval has not elapsed since the last clearing of the measurement counter, or if a particular entering impulse sequence has been stored in the measurement counter since its last clearance and before the expiration or elapse of the predetermined time interval.

If the problem to be solved does not involve a particular time interval but, for example, the comparison of two entering impulse sequences, then the counting mechanism can be designed in such a way as to include two electrical impulse and storing counters with an entering impulse of one counter clearing the other counter and with each of the two counters delivering an exit impulse only if a preselected impulse sequence, or a preselected number of impulses, enters either counter before the latter is cleared by an entrance impulse of the other counter.

Advantageously, the electrical impulse storing counters can utilize magnetic storage units such as ferrite cores having a substantially rectangular hysteristis loop, with these cores being provided with supplementary clearing windings. Thus, the cores in the measurement counters may be provided with a clearance winding which is excited by an exit impulse of the time counter, and the cores in the time counter may be provided with a clearance winding which is excited by an entrance impulse of the measurement counter. The measuring counter and the time counter also may be designed as slide registers consisting of such magnetic cores or of transfluxors.

For further increasing the discrimination with respect to disturbance pulses, the exit impulse of the time counter, before amplification, may be passed through an L–R low pass filter which will filter out relatively short disturbance impulses but which will pass the longer useful impulses. Such filters may be designed with respect to the desired program, in a known manner.

The measurement counter may also comprise two or more partial counters which are arranged to receive different entering impulses or which differ from each other in their manner of counting and storing, such as in the indexing function, the connections of the exit impulse circuit, the clearing excitation, or other design functions.

While the electrical counting mechanism of the invention may be employed for a great diversity of purposes, it may be especially mentioned that it is useful for discriminating between disturbance impulses and periodically repeating echo impulses, such as used in a reflection sounding method, as well as for ascertaining radiation levels and for distinguishing between various preselected impulse groups.

For an understanding of the present invention, reference is made to the following description of typical embodiments thereof as illustrated in the accompanying drawings.

Figure 1:
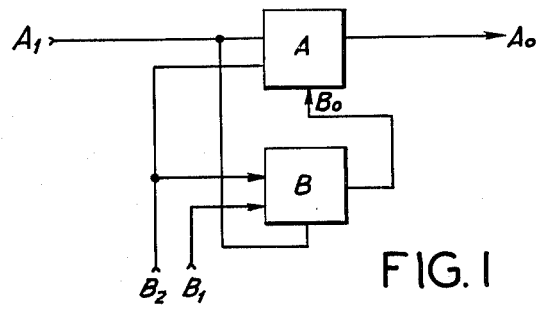
FIG. 1 is a block diagram of electrical counting mechanism embodying the invention and comprising a measuring counter and a time counter.
Figure 2:
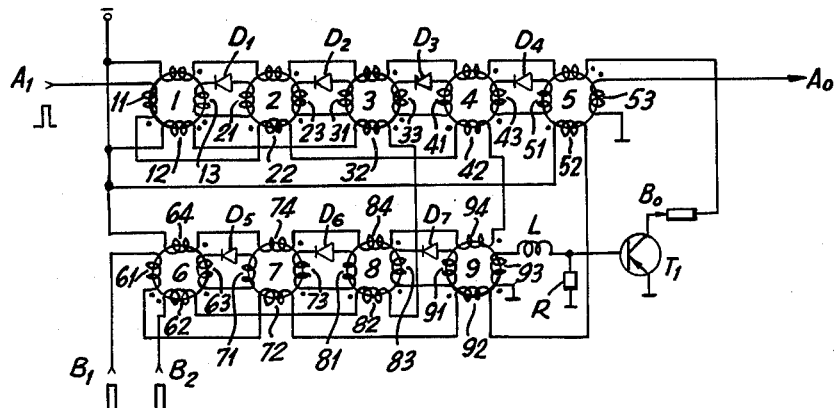
FIG. 2 is a schematic wiring diagram of the counting mechanism illustrated in block in FIG. 1.
Figure 3:
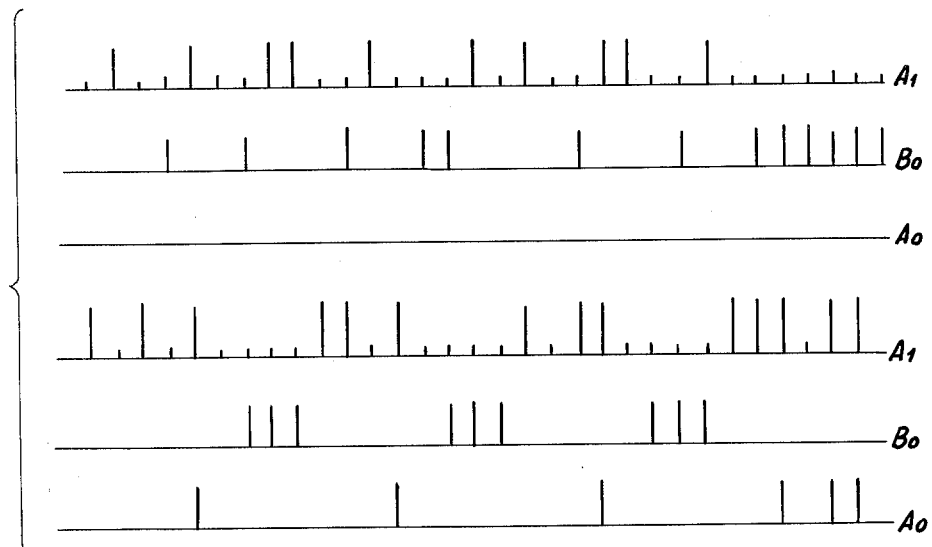
FIG. 3 is a graphical illustration of the manner of operation of the counting mechanism of FIGS. 1 and 2.

Referring to the drawings, and more particularly to FIGS. 1, 2 and 3, the main components of the counting mechanism embodying the invention are two electrical impulse storing counters A and B which are connected in opposition relative to their respective functions. Counter A, which may be called a measurement counter, counts the impulse periods during which entrance impulses $A_1$ occur. However, the stored contents of counter A may be cleared by an exit impulse $B_0$ of counter B, which may be termed a time counter. Time counter B counts the successive periods of impulse sequences such as, for example, the period during which transmitted impulses $B_1$ are counted. Conversely, the counter B is cleared by every entering impulse $A_1$. As a result, counter B counts only those impulse periods in which there is no occurrence of an entrance impulse $A_1$.

If, during a time interval involving $n$ periods of impulse sequences, the counter A counts $m$ or more impulse periods in which there occur entrance impulses $A_1$, then the counter A delivers one or more exit impulses $A_0$. If, during this same time period, there are counted fewer than $m$ impulse periods during which there occur entrance impulses $A_1$, then counter B delivers an exit impulse $B_0$ which clears the contents of counter A. Accordingly, the entrance impulses which have occurred up to the time of such clearing, are evaluated as disturbance impulses and are cleared by the clearing of counter A so that there will be no occurrence of an exit impulse $A_0$.

While counters A and B may comprise any known type of counter circuitry, a particular simple counter, operable efficiently with the counting mechanism of the present invention, is provided by utilizing magnetic storage units, such as ferrite cores having rectangular hysteresis loops. Accordingly, the following detailed description will relate to counters employing such rectangular hysteresis loop magnetic cores and operating as slide registers with two storage cores per bit. It will be understood that other forms of counters utilizing such storage cores may be used, such as flip-flops, slide registers with one storage core per bit, or slide registers comprising transfluxors.

FIG. 2 illustrates a schematic wiring diagram of counting mechanism embodying the invention, and utilizing such magnetic storage cores. Counter A comprises cores 1 through 5, while counter B comprises cores 6 through 9. Each counter is, in effect, a shift register which is controlled by different current impulses. Reference characters $B_1$ and $B_2$ indicate entering impulses which act in counter B, in a known manner, as shifting impulses in the windings 62, 72, 82 and 92 and which follow each other periodically at the frequency of the impulse sequences. The impulse $B_2$ may, for example, coincide in time with the transmitted impulse of a locating device. The impulse $B_1$ cannot coincide in time with the impulse $B_2$, nor may it occur at a time during which an entrance impulse $A_1$ may be expected.

In counter A, current impulse $B_2$ is operative as a shifting impulse in the windings 12 and 32. The current impulse $A_1$ entering the counter A may have three different functions. In the first place, it is stored in magnetic core 1 by means of a winding 11. The shifting impulse $B_2$ following the impulse $A_1$ shifts the stored entrance impulse $A_1$ into the core 2, by means of a "primary winding" 12 and a "secondary winding" 13, and through the medium of a winding 21 and then conductive diode $D_1$.

As a second function, the entering impulse $A_1$ can operate as a shift impulse with respect to core 2 by means of the windings 22, 23 and 31 and a diode $D_2$, in the event that core 2 has already been remagnetized by an earlier entering impulse $A_1$ shifted from core 1 into core 2. The same function takes place with respect to core 4 through the medium of the corresponding windings 42, 43 and 51.

As a third function, the entering impulse $A_1$ can serve as a clearing pulse in the windings 64, 74, 84 and 94. Since the cores 6, 7, 8 and 9 are all magnetized by the clearance windings in the same direction and at the same time, there can be no transmission of an impulse from one core to another, such as a shifting of an impulse.

The manner of operation of the counting mechanism in a time sequence is as follows:

(1) Impulse $B_1$ is stored in core 6 by means of winding 61.

(2) Impulse $B_2$ shifts the stored impulse $B_1$ from core 6 into core 7.

(3) Another impulse $B_1$ is stored in core 6, with the previous impulse $B_1$ being shifted from core 7 into core 8.

(4) An impulse $B_2$ shifts a stored impulse $B_1$ into core 9 or 7.

(5) An impulse $B_1$ is again stored in the core 6, with a further shifting from core 7 to core 8 resulting in an exit impulse appearing, through an L–R filter, as a forward biasing signal on a transistor $T_1$. The collector current of the transistor $T_1$ provides a current impulse $B_0$ which acts as a clearing impulse in all of the cores of counter A, by virtue of flowing through the windings 14, 24, 34, 44 and 54.

As a result, all of the impulses $A_1$ stored in the cores 1 through 4 up to that time are cleared, and all of the cores are magnetized back to the starting position zero. Thus, a shifting impulse now occurring will no longer result in there being an exit impulse because it traverses the core windings in the same directions as does the clearing impulse so that none of the cores can be remagnetized. If core 5 receives an impulse it will, even during remagnetization by means of the clearing winding 54, deliver an exit impulse to the winding 53. Thus, this particular impulse has traversed the counting system. In other words, the counting system has established that the first impulse is a sequence of at least $m=3$ entrance impulses $A_1$ and that, between two impulse periods in which entrance impulses $A_1$ occur, there is at least one impulse period during which no entrance impulse $A_1$ occurs.

Thus, the counting process proceeds, with each impulse B₁ producing, through the transistor T₁, a clearance impulse B₀ which clears the counter A. Usually, the counter A is already cleared, so that the clearance impulse no longer has any practical effect thereon.

When an impulse A₁ enters the counting mechanism, the latter functions as follows:

(6) Entering impulse $A_1$ arrives at counter A, resulting in complete clearing of counter B so that the counting process of the latter must be restarted as previously described. The entrance impulse $A_1$ is stored in the core 1.

(7) An entering impulse $B_1$ has, at first, no influence on the counter A. However, with respect to counter B, this entering impulse $B_1$ is stored in the core 6 by means of the winding 61.

(8) An entering impulse $B_2$ operates on counter A to shift the stored impulse $A_1$ from core 1 into core 2. At the same time, and with respect to counter B, it shifts the stored impulse $B_1$ from core 6 into core 7.

(9) An entering impulse $A_1$ is again stored in core 1, resulting in a transmission from core 2 to core 3. Also, counter B is again completely cleared.

(10) The next impulse $B_1$ has, at first, no influence on counter A. This next impulse $B_1$ is again stored in the core 6 by means of the winding 61.

(11) The next entering impulse $B_2$ shifts the core 2 and also effects transmission from core 3 to core 4. This impulse $B_2$ shifts the core 7.

(12) A further entering impulse $A_1$ effects a shift from core 4 to core 5 and from core 2 to core 3, and is stored in core 1. At the same time, the counter B is again completely cleared.

(13) A following impulse $B_1$ switches the core 5 back and provides, at winding 53 of core 5, an exit impulse $A_0$.

Each succeeding impulse $A_1$ brings about a further transmission from core 4 to core 5 so that, at the next current impulse $B_1$, there is again provided an exit impulse $A_0$.

If no impulse $A_1$ enters the counting mechanism during two impulse periods, winding 93 of counter B, through the medium of transistor T₁, provides a clearance impulse $B_0$ to clear the counter A so that the counting procedure must be restarted. This may be the case in the event that counter A has first any exit impulses $A_0$ at all.

FIG. 3 illustrates the relation of the entering impulses $A_1$, the clearance impulses $B_0$, and the exit impulses $A_0$ for various time combinations of impulses $A_1$. It should be noted that the counters shown in FIG. 2 are only exemplary, and that counter A always has $2m-1$ cores and counter B always has $2n$ cores.

For either clearance or indication, when $m$ denotes the number of impulse periods during which there occur impulses $A_1$, $n$ denotes the impulse periods during which no entrance impulses occur, $k_B$ denotes the number of cores of counter B, and $k_A$ denotes the number of cores of counter A, the following conditions are valid:

$$k_B \leq 2n$$

or (a)
$$n \geq \frac{k_B}{2}$$

The condition for an exit impulse $A_0$ is:

$$k_A \leq 2m-1$$

or (b)
$$m \geq \frac{k_A+1}{2}$$

As will appear from the exemplary statements made hereinafter, it is advantageous to interpret the functioning of the counting mechanism from the standpoint of probability calculation.

(c)
$$w = \frac{m}{m+n}$$

is the relative probability. Also, $w$ may be interpreted as the "relative probability limit" of the counting mechanism. According to the clearance condition (a), the condition that $n=k_B/2$ is valid for the counting arrangement shown in FIG. 2. That is, in order for no clearance to be effected, $n$ must equal 1. This means that between every impulse period which contains an entrance impulse $A_1$ there must be, at the most, only one impulse period during which no entrance impulse occurs. In this special case, therefore, $w=1/(1+1)=0.5$. If the relative probability is such that $w=0.5$ and it is reached or exceeded, then the clearance condition is no longer fulfilled. However, if the relative probability limit is exceeded so far that at least, according to (b), $m=(k_A+1)/2$, and thus, in the illustrative example, $m=$three impulses, which can pass through the counter, then the counting mechanism delivers an exit impulse $A_0$.

The described arrangement can be used wherever it is necessary to ascertain when an average probability limit is consistently exceeded. Thus, it can be used with all problems based on statistical processes or for the regulation of error deviations which may occur, for example, such as length, thickness, speed, or angle errors.

In order for counter A to furnish an exit impulse $A_0$, the clearance of counter A cannot take place while the conditions for an exit impulse must be fulfilled. From the combination of these two conditions, it follows that a large number of different impulse combinations can still produce an exit impulse $A_0$ with a minimum number of entering impulses $A_1$. As can be seen from FIG. 3, with the arrangement of FIG. 2, only four entrance impulse combinations leading to an exit impulse from the counter A are possible. With the use of a larger number of cores than in the specific arrangement shown in FIG. 2, the number of possible combinations increases very rapidly. The proper number of cores depends solely upon the use to which the counting mechanism is to be put, and must be adapted to a particular counting system.

The possible uses of the counting mechanism thus far described are very diverse. Of a large number of possible uses, the following may be particularly mentioned. The counting mechanism may be advantageously used for digital evaluation of echo impulses in a proximity ignition system. Except for disturbance impulses which can be expected occasionally, no echo impulses are received until the target is so close that echo signals reflected from the target are received. Since a particular number of echo signals reflected from the target must first enter the counting mechanism before an exit impulse can be delivered thereby, it may be safely assumed that fortuitously occurring disturbance impulses, or echo impulses, from too small targets which are swept only briefly, cannot cause an unintended release of an exit impulse. A single shot blocking oscillator interposed between the output of the impulse receiver and the input of the counting mechanism assures that only entrance impulses equaling or exceeding a particular amplitude will be counted. Such an oscillator transforms the entering impulses into impulses of constant current value and duration, such as are advantageous for controlling the magnetic cores.

The described counting mechanism can also be used advantageously as an automatic warning means for too high a level of radioactive radiation. In such case, the entrance impulses $A_1$ are derived from a Geiger counting tube. An impulse oscillator, having a constant or regulatable impulse frequency, delivers the shifting impulses $B_1$ and $B_2$. The frequency of this oscillator is set at such a value that, below the particular density of radiation, the entrance impulses $A_1$ from Geiger tube cannot pass through the counter A because, due to there being too small a number of such entrance impulses during a given time period, the counter A is repeatedly cleared by exit impulses $B_0$ from the counter B. If the average statistical radiation density increases, then, and conversely, it is the counter B which is repeatedly cleared by the entrance impulses $A_1$, so that the counter B is no longer effective to produce a clearing impulse $B_0$ for clearing the counter A. Under these conditions the entrance impulses $A_1$ pass through the counter A and appear as exit impulses $A_0$ which may be used to trigger regulating arrangements or to activate other safety measures. It should be noted that statistical variations in the entering impulse density are the better compensated the larger the number of cores contained in the counters A and B.

In the two specific uses mentioned above, the simple construction, minimum current consumption, minimum detail requirements, and minimum space requirements, as well as the temperature sensitivity of the circuitry, are particularly advantageous. An equivalent transistor circuitry, not using the magnetic storage cores would, on the other hand, require several times the number of construction parts or components, particularly components susceptible to disturbance.

Figure 5:
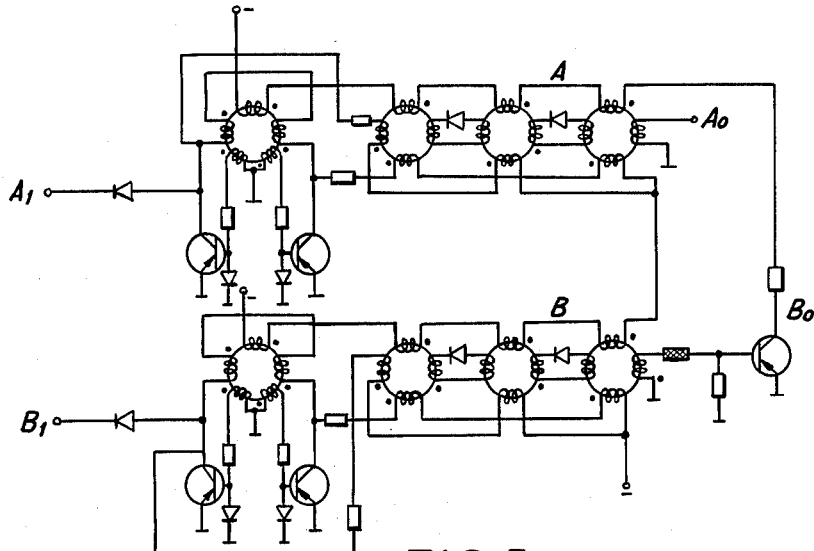
FIG. 5 is a schematic wiring diagram of the counting mechanism shown in block form in FIG. 4.
Figure 6:
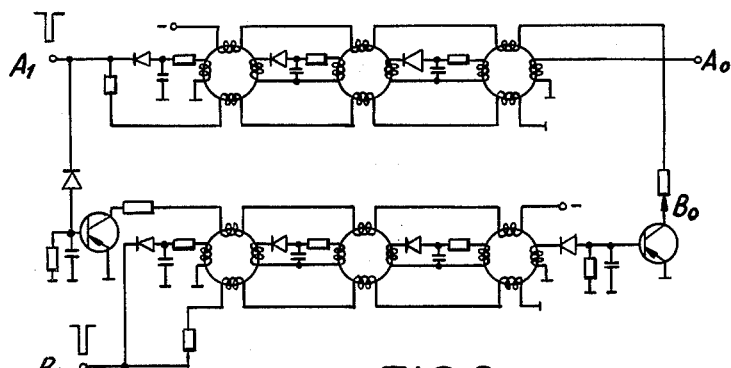
FIG. 6 is another schematic wiring diagram of a counting mechanism such as shown in block form in FIG. 4.
Figures 4, 7, 8, 9:
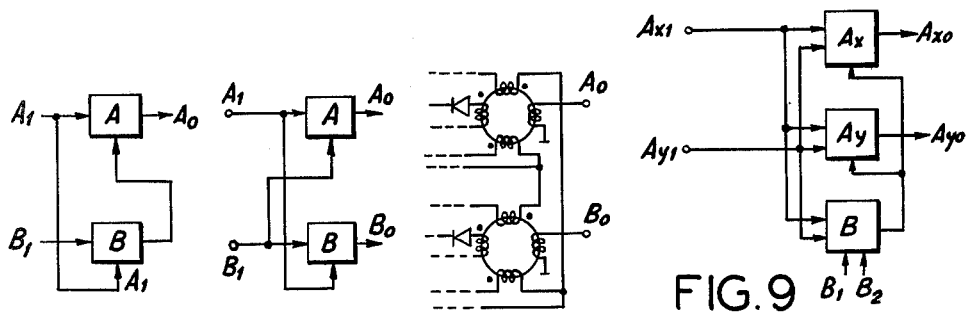
FIG. 4 is a block diagram of a modified form of the counting mechanism shown in FIG. 1.
FIG. 7 is a block diagram of a modification of the counting mechanism as used for speed regulation.
FIG. 8 is a schematic wiring diagram of a part of the counting mechanism of FIG. 7.
FIG. 9 is a block diagram of a counting mechanism, embodying the invention, and including one time counter and two measuring counters.

The wiring arrangement schematically shown in FIG. 2 can be modified in various manners. Thus, when the wiring arrangement is used for radiation detection, it may be advantageous to count not only the impulse periods which contain an entering impulse but also to count the entering impulses themselves. In order to effect this, it is necessary for each entering impulse $A_1$ to shift all of the already stored entering impulses by one core in the exit direction. FIGS. 4, 5 and 6 show two examples of counters by means of which this may be accomplished. In FIGS. 4 and 5, the two necessary shift impulses are produced by preconnected core storage flip-flops. In FIG. 6, the counter is arranged in a known manner as a shift register, with one core per bit. In this case, only one shift impulse is necessary to effect a shift of the whole register. As in FIG. 2, each entrance pulse $A_1$ clears the counter B, and each exit impulse $B_0$ of the counter B clears the counter A.

The modified counting mechanism shown in FIG. 7 is useful in digital regulating systems. If, for example, the speed of a motor is to be regulated, the actual speed is converted into impulse sequences. This actual speed value, thus converted, is compared with a theoretical value in a digital difference counter. If the speed or r.p.m. increases above the theoretical value, exit impulses will be delivered from one output of the difference counter. If the speed or r.p.m. decreases, exit impulses will be delivered from a second output of the difference counter. Since the theoretical value must be derived from a stabilized frequency by distribution, which is likewise true of digital counters, at the majority of speed ratios there occurs a somewhat unsteady impulse sequence. Impulses of the original frequency are absent, so that, on the whole, the desired number of pulses per second is obtained. This unsteadiness of the theoretical or comparison value has the result that, without the interposition of an equalizing arrangement, the desired setting of the regulating system would fluctuate continuously. The counting mechanism illustrated in FIG. 7 is effective to accomplish this equalizing task and works in a manner similar to that of a stabilizing filter in an analog regulating circuit.

Thus, with decreasing speed of the motor, for example, the impulses from the difference counter are delivered into the counting mechanism of FIG. 7 as entrance impulses $A_1$ but, at increasing speeds of the motor, the impulses of the difference counter are delivered to the counting mechanism as impulses $B_1$. Thereby, the counting mechanism shown in FIG. 7 delivers exit impulses when the speed limit is persistently varied in either direction from the desired limit. Depending upon whether an exit impulse is delivered from counter A or from counter B, the speed is varied in either a positive or a negative direction. If the actual speed coincides with the desired speed, or if the actual speed fluctuates slightly about the theoretical speed, or if the theoretical speed is, as described, composed of individual impulse groups, the counting arrangement will not deliver any exit impulse. A characteristic of the counting mechanism as shown in FIGS. 7 and 8 is the fact that any impulse $A_1$ will clear the counter B, and any impulse $B_1$ will clear the counter A.

Figure 10:
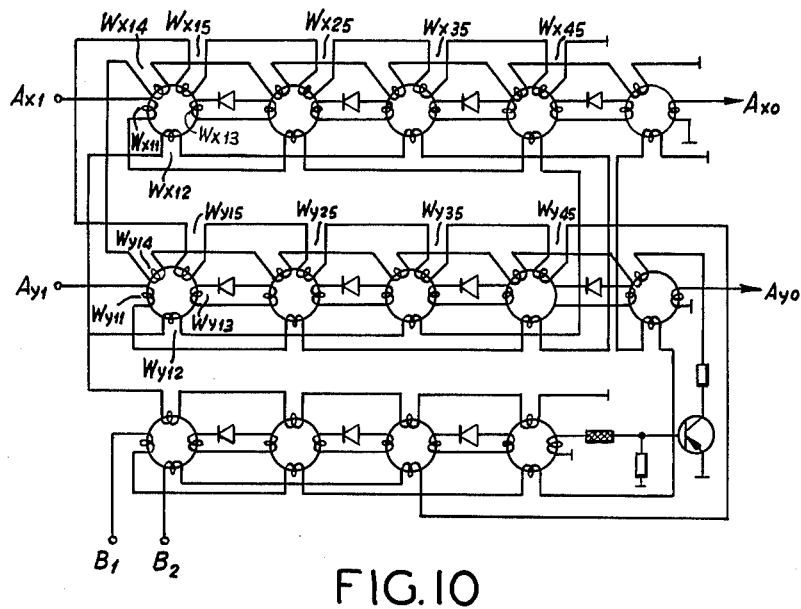
FIG. 10 is a schematic wiring diagram of the counting mechanism shown in block form in FIG. 9.

In the modified counting arrangement shown in FIG. 9 and 10, the counting mechanism can ascertain in which of two communications channels there first occurs one entrance impulse per impulse period in a persistant manner, such as over several impulse periods. While the components of this arrangement have the same configuration as in FIG. 1, there are two partial measurement counters $Ax$ and $Ay$. In addition, the feeding circuitry for the entering impulses $Ax1$ and $Ay1$ differ somewhat from each other, as may be observed from the wiring diagrams of FIGS. 9 and 10.

In counter $Ax$, an entrance impulse $Ax1$ functions in the same manner as does the entrance impulse $A_1$ of the arrangement shown in FIGS. 1 and 2, and thus is stored in core 1 of counter $Ax$ and clears the counter B. Furthermore, an entrance impulse $Ax1$ also functions as a shifting impulse in the counter $Ay$, and this substitutes for the shift impulse $B_2$ of FIG. 2. The entering impulse $Ay1$ has analogous functions in the counters $Ay$ and $Ax$.

If it is assumed that a series of impulses appears at the inputs of counters $Ax$ and $Ay$, with the impulses $Ax1$ slightly preceding the impulses $Ay1$ in time, the impulses $Ax1$ are always stored in the counter $Ax$ and shifted, by the next entrance impulse $Ay1$, into either the second core or the next even-numbered core.

Figure 11:
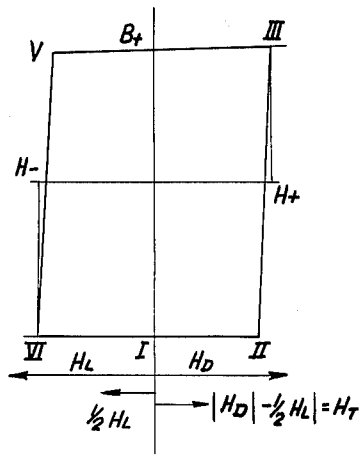
FIG. 11 illustrates graphically the manner of operation of counting mechanism, embodying the invention, where magnetic storage cores are utilized in the counters.

An entrance impulse $Ay1$ is stored in the first core of the counter $Ay$ but, in the same impulse period, there is not present any impulse for shifting this stored impulse $Ay$ into the second core or next even-numbered core. However, in accordance with the invention, the counter $Ax$ is effective, after an impulse series of $n$ entrance impulses, to deliver in both exit channels impulses $Ax0$, only in the event that the impulses $Ax$ precede the impulses $Ay$ in each impulse period. The core is remagnetized from its rest position $B-(I)$ through $(II)$ to $(III)$, as shown in FIG. 11. At the end of the impulse, the remanance induction $B+$ remains in the core.

The impulse $Ay1$ produces a field strength $$|H-| \leq |H_{y1}| + \left|\frac{I_{y1}w}{\lambda}\right|$$

The winding is polarized in such a manner that core 1 is magnetized in its rest position from (V) through (VI). At the end of the impulse, the remanence induction $B-(I)$ remains in the core. During the remagnetization, a voltage is produced at exit winding $Wx13$ in which $$e_w = -\frac{d\phi}{dt}$$

which has a direction such that the diode becomes conductive in the direction of the core 2. The diode current $I_D$ produced by the voltage $e_w$ is sufficient to remagnetize the core 2 so that:

$$|H+| = |H_D| = \left|\frac{I_Dw}{\lambda}\right|$$

With the assistance of additional windings $Wx15$ through $Wx45$, and $Wy15$ through $Wy45$, which are common to all of the cores of counters $Ax$ and $Ay$ and which are fed by a current impulse occurring periodically with respect to the frequency of the entering impulse frequency and after the end of the receiving period, some of the stored signals are cleared. But stored impulses are thus cleared only if they remain in the first core or any other odd-numbered core. This is always the case when they have been stored by an impulse which could not be shifted into an even-numbered core because the stored impulse was, at the same time, the last one in the impulse period. The difference in the effects of the special clearance windings is obtained by corresponding dimensioning of the windings on the individual storage cores. The detail relations will be understood from an understanding of the basis of the hysteresis curve of a storage core.

It will be explained first what occurs magnetically in the first core of the counter $Ax$. Assuming that the impulse $Ax1$ lies ahead of the impulse $Ay1$, the impulse $Ax1$ produces a magnetic field strength in the core 1 such that $$|H+|=|H_{x1}|\leq \left|\frac{Ix1w}{\lambda}\right|$$

$\lambda$=core constant.

The impulse is thus stored in core 2, and the particular receiving cycle is terminated. Such termination occurs at the end of an impulse period of the partial clearing impulse producing in core 1 a magnetic field strength $H_L$. The core 1 is already in its rest position B— where the signal has no effect.

However, the clearance windings of the even-numbered cores are wound with only half the number of turns of the partial clearing windings of the odd-numbered cores, so that the field strength in the core 2 attains a value of only $\frac{1}{2}H_L$. Such a field strength is not sufficient, by itself, to remagnetize core 2. Thus, the impulse remains stored in core 2 until, by the next impulse $Ax1$, it is shifted into the core 3 and, from there, by another impulse $Ay1$, into the core 4, and so forth.

In counter $Ay$, the first impulse $Ax1$ had no effect because it tended to magnetize in the direction of the rest state, which is present anyway because of the preceding impulses due to the clearing windings $Wy14$ through $Wy45$. But the first impulse $Zy1$ is stored in the first core of counter $Ay$ so that this core retains its remanence B+. The next partial clearing impulse effects a remagnetization in this core because the field strength $H_L$ is effective. The diode again transmits a current which produces, in the second core, a field strength $H_D=H+$. However, the partial clearing field strength $\frac{1}{2}H_L$ in this core counteracts the field strength $H_D$ so that the second core is not remagnetized. Consequently, the information in the counter $Ay$ is cleared. The process is repeated at all further entrance impulses provided $Ax1$ is temporarily ahead of impulses $Ay1$.

However, if impulses $Ay1$ precede an impulse $Ax1$, then the counters $Ax$ and $Ay$ exchange roles, because the construction of both counters is exactly the same. If the impulses $Ax1$ and $Ay1$ coincide in time, transmission from one core to the other cannot occur so that no exit impulses are delivered. If impulses $Ax1$ and $Ay1$ alternate with each other rapidly, as the preceding impulse, then again the counting mechanism does not deliver any exit impulses because the stored impulses are always cleared by the partial clearing impulses. The counters operate in the same manner as described in connection with FIGS. 1 and 2, in that the counters $Ax$ and $Ay$ are cleared by exit impulses from counter B when no further entering impulses are received after the lapse of a predetermined time.

Figure 12:
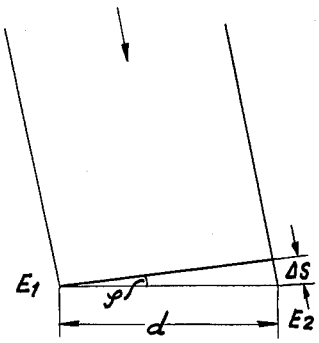
FIGS. 12 and 13a–13f are graphical illustrations of the manner of operation of the counting mechanism when used in echo sounding apparatus for discriminating between echo impulses and disturbance impulses.

The counting system or mechanism shown in FIGS. 9 and 10 may be used, for example, as an active or passive direction finder. If, during the active process, a transmitter sends out an impulse which is received as a direct or a reflected impulse by two receivers $E_1$ and $E_2$ whose antennas are spaced by the distance $d$ (FIG. 12), then the course difference $$S=d \sin \varphi$$

In this case
$\varphi$=off-bearing angle
$d$=base length between antennas
$v$=propagation velocity
$t$=time difference between impulses
If $\Delta S = v\Delta t$, then $$\varphi_{min.}=\text{arc sin }\frac{\Delta S}{d}=\text{arc sin }\frac{v\Delta t}{d}$$

$$\overline{\varphi}_{min.}=\frac{v\Delta t_{min.}}{d}$$

for small values of $\varphi$.

The lower limit of the angle which can be resolved is an inverse function of the propagation velocity or a direct function of the base length. The value of $t_{min}$ is practically a core constant, and has an order of magnitude of two microseconds. With sound waves, a very good angular resolution is possible.

Advantageously, the high frequency received signal is first rectified and then differentiated, to obtain the direct current level. The thus differentiated signal actuates, in each channel, a blocking oscillator which furnishes the entrance current impulses $Ax1$ or $Ay1$.

As a passive direction-finding system or receiving a noise spectrum of a disturbance source, the counters $Ay$ and $Ax$ can be employed for correlation. Since, in this case, there is no impulse sequence frequency, the partial clearing impulses must be derived from the signal itself (FIGS. 13a–13f and 14). The partial clearing impulse occurs after a delay of the time $T_1$ following a received impulse. The level of the received signals should be just sufficient that, at the most, only one blocking impulse is released by a noise peak during the time $T_1$. Since the same signal is received in both channels, consequently one blocking oscillator is activated in each channel.

Figure 13A:
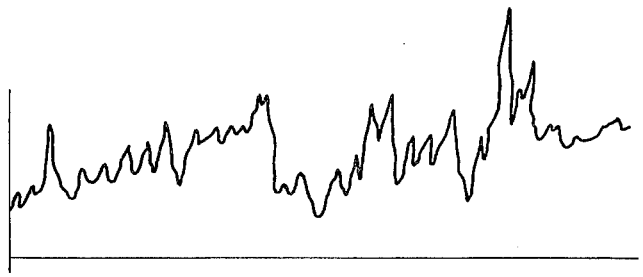
Figure 13B:
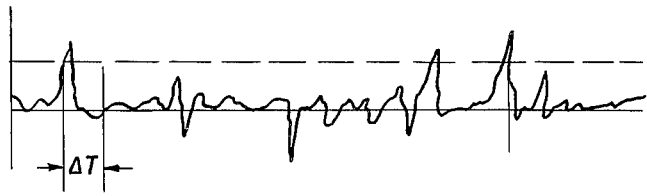
Figure 13C:
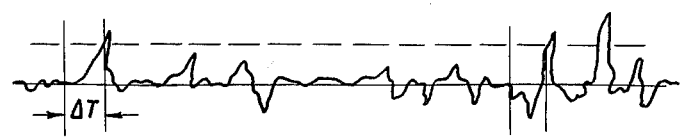
Figure 13D:
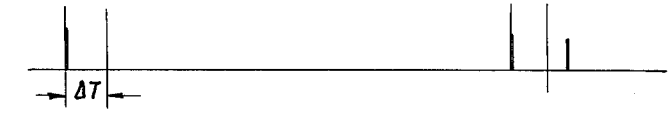
Figure 13E:
Figure 13F:
Figure 14:
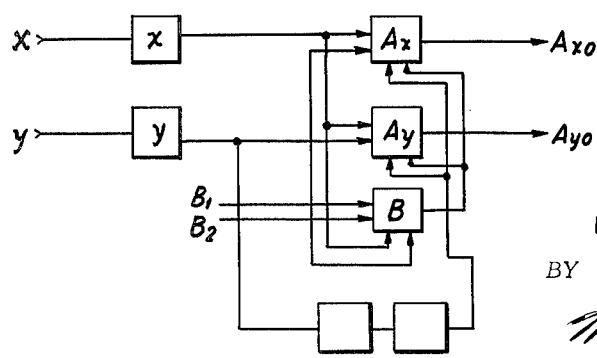
FIG. 14 is a block diagram of a modified form of the counting mechanism, according to the invention, as provided with time delay means.

FIG. 13a shows a rectified noise signal at the exit of the receiver X, FIG. 13b shows a differentiated noise signal $X_1$ and FIG. 13c a signal $Y_1$. FIGS. 13d and 13e show the released blocking impulses which correspond to the entrance impulses $Ax1$ and $Ay1$. FIG. 13f illustrates the partial clearing impulses which are produced after a delay time $T_1$ following a blocking release.

While specific embodiments of the invention have been shown and described in detail to illustrate the application of the principles of the invention, it will be understood that the invention may be embodied otherwise without departing from such principles.

What is claimed is:

1. Electrical counting mechanism comprising, in combination, a first electrical impulse storing counter; a second electrical impulse storing counter; means entering first impulses in said first counter; means entering second impulses in said second counter; means, including an interconnection between said counters, operable, responsive to a first predetermined combination of stored first and second impulses, to deliver an exit impulse from one of said counters; and means interconnecting said counters and effective, responsive to the presence of such first predetermined combination of stored first and second impulses to deliver a clearing impulse from said second counter to said first counter to clear said first counter before delivery of such exit impulse and effective, responsive to the presence of a second predetermined combination of stored first and second impulses, to deliver a clearing impulse from said first counter to said second counter to clear said second counter before delivery of such exit impulse.

2. Electrical counting mechanism comprising, in combination, a measurement counter effective to count and store received measurement impulses; a time counter controlled by received time impulses having a preselected time sequence; means in said measurement counter effective, responsive to receipt of at least a predetermined number of counted and stored measurement impulses, to deliver an exit impulse from said measurement counter; means inter-connecting said measurement counter and said time counter; means in said time counter operable, in the event that said time counter has counted a first preselected number of time impulse periods without said measurement counter receiving a measurement impulse, to deliver an exit impulse through an exit impulse circuit to said measurement counter to clear the latter; and means in said measurement counter operable, responsive to receipt of a second predetermined number of measurement impulses before receipt by said time counter of said first predetermined number of time impulse periods, to deliver such exit impulse.

3. Electrical counting mechanism, as claimed in claim 2, including an amplifier in the exit impulse circuit of said time counter; and an L-R low pass filter in said exit impulse circuit in advance of said amplifier and effective to pass only relatively longer useful impulses.

4. Electrical counting mechanism as claimed in claim 2, including radiation responsive impulsing means effective to deliver impulses proportional to the concentration of radiation; said measurement impulses constituting impulses received from said last-named means.

5. Electrical counting mechanism comprising, in combination, a measurement counter effective to count and store received measurement impulses; a time counter controlled by received time impulses having a preselected time sequence; means in said measurement counter effective, responsive to receipt of at least a predetermined number of counted and stored measurement impulses, to deliver an exit impulse from said measurement counter; means interconnecting said measurement counter and said time counter; said time counter, in the event that it has counted a first preselected number of time impulse periods without said measurement counter receiving a measurement impulse, delivering an exit impulse through an exit impulse circuit to said measurement counter to clear the latter; said measurement counter, responsive to receipt of a second predetermined number of measurement impulses before receipt by said time counter of said first predetermined number of time impulse periods, to deliver such exit impulse; each of said counters comprising a respective number of interconnected magnetic storage memory cores; first clearing windings on each of the cores in said measurement counter; second clearance windings on each of the cores in said time counter; means operable, responsive to delivery of an exit impulse from said time counter, to energize said first clearance windings to clear said measurement counter; and means operable, responsive to receipt of a measurement impulse by said measurement counter, to energize all of said second clearance windings to clear said time counter.

6. Electrical counting mechanism, as claimed in claim 5, including an amplifier in the exit impulse circuit of said time counter; and an L-R low pass filter in said exit impulse circuit in advance of said amplifier and effective to pass only relatively longer useful impulses.

7. Electrical counting mechanism, as claimed in claim 5, in which each of said measurement counters and said time counter comprise at least one magnetic storage core flip-flop.

8. Electrical counting mechanism, as claimed in claim 5, in which said measurement counter and said time counter are designed as shift register counters.

9. Electrical counting mechanism, as claimed in claim 8, including an amplifier in the exit impulse circuit of said time counter; and an L-R low pass filter in said exit impulse circuit in advance of said amplifier and effective to pass only relatively longer useful impulses.

10. Electrical counting mechanism comprising, in combination, a measurement counter effective to count and store received measurement impulses; a time counter controlled by received time impulses having a preselected time sequence; means in said measurement counter effective, responsive to receipt of at least a predetermined number of counted and stored measurement impulses, to deliver an exit impulse from said measurement counter; means interconnecting said measurement counter and said time counter; said time counter, in the event that it has counted a first preselected number of time impulse periods without said measurement counter receiving a measurement impulse, delivering an exit impulse through an exit impulse circuit to said measurement counter to clear the latter; said measurement counter, responsive to receipt of a second predetermined number of measurement impulses before receipt by said time counter of said first predetermined number of time impulse periods, delivering such exit impulse; said measurement counter comprising at least two partial measurement counters; and means for delivering different respective series of electrical impulses to each of said partial measurement counters; said partial measurement counters differing from each other in their counting operation.

11. Electrical counting mechanism, as claimed in claim 10, including means for delivering a preselected respective impulse group to each of said partial measurement counters; the partial measurement counter receiving its impulses in advance of the other partial measurement counter delivering an exit impulse and clearing the other partial counter.

References Cited by the Examiner

UNITED STATES PATENTS

| 2,931,570 | 5/1960 | Johnstone | 235—92 X |
| 3,017,084 | 1/1962 | Guterman | 235—92 |
| 3,040,293 | 6/1962 | Watt | 340—3 |
| 3,061,812 | 10/1962 | Rachwalski | 340—3 |
| 3,062,440 | 11/1962 | Kelly | 235—92 |
| 3,204,099 | 8/1965 | Ludlum | 250—83.6 |

IRVING L. SRAGOW, *Primary Examiner.*

KATHLEEN H. CLAFFY, *Examiner.*

R. G. LITTON, M. S. GITTES, R. A. FARLEY,
*Assistant Examiners.*